United States Patent [19]

Hattan et al.

[11] Patent Number: 4,856,198
[45] Date of Patent: Aug. 15, 1989

[54] GAUGE FOR INTERNAL THREADS

[75] Inventors: Mark Hattan, Orange; Robert G. Dodge, Glendale, both of Calif.

[73] Assignee: William P. Green, Pasadena, Calif.

[21] Appl. No.: 191,611

[22] Filed: May 9, 1988

[51] Int. Cl.$^4$ ............................ G01B 3/48; G01B 5/12
[52] U.S. Cl. .................................................. 33/199 R
[58] Field of Search ..................................... 33/199 R

[56] References Cited

U.S. PATENT DOCUMENTS

| 1,714,780 | 5/1929 | Hartness . |
| 1,829,797 | 11/1931 | Hartness . |
| 1,875,872 | 9/1932 | Hoke . |
| 1,877,307 | 9/1932 | Hartness . |
| 1,905,705 | 4/1933 | Hartness . |
| 2,883,760 | 4/1959 | Eriksson . |
| 4,417,402 | 11/1983 | Hattan . |

OTHER PUBLICATIONS

Southern Gage Co., "Tri-Roll Thread Comparators", Jun. 1979, pp. 1–12.
MTG, "Internal Gaging", May 1981, pp. 1–12.

Primary Examiner—Harry N. Haroian
Attorney, Agent, or Firm—William P. Green

[57] ABSTRACT

A gauge for measuring an internal thread formed within a passage in a nut or other member, and including two gauge elements having similar external threads adapted to project into the threaded passage along the axis of the internal thread and from opposite ends of the passage to engage opposite ends of the internal thread, and two indicators carried by the gauge elements at locations axially outwardly beyond the opposite ends of the passage and having portions extending externally of the passage to positions at which the rotary setting of one indicator can be read against the rotary setting of the other. At least one of the rotary elements (preferably both) is rotatably adjustable relative to the corresponding gauge element, and releasably lockable in any of different set positions relative thereto as an initial setting of the tool.

37 Claims, 2 Drawing Sheets

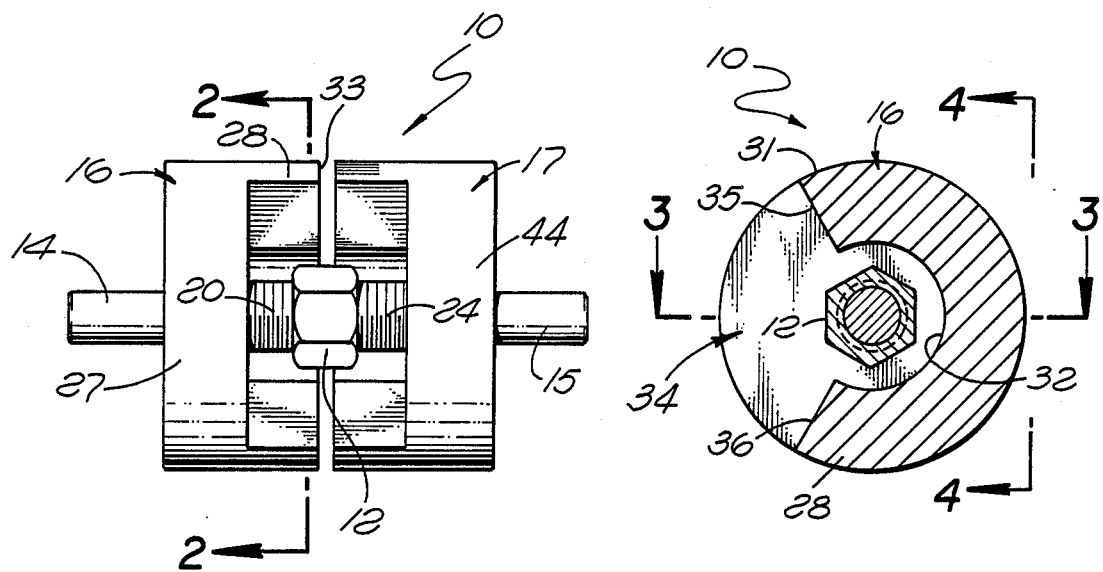
FIG. 1
FIG. 2
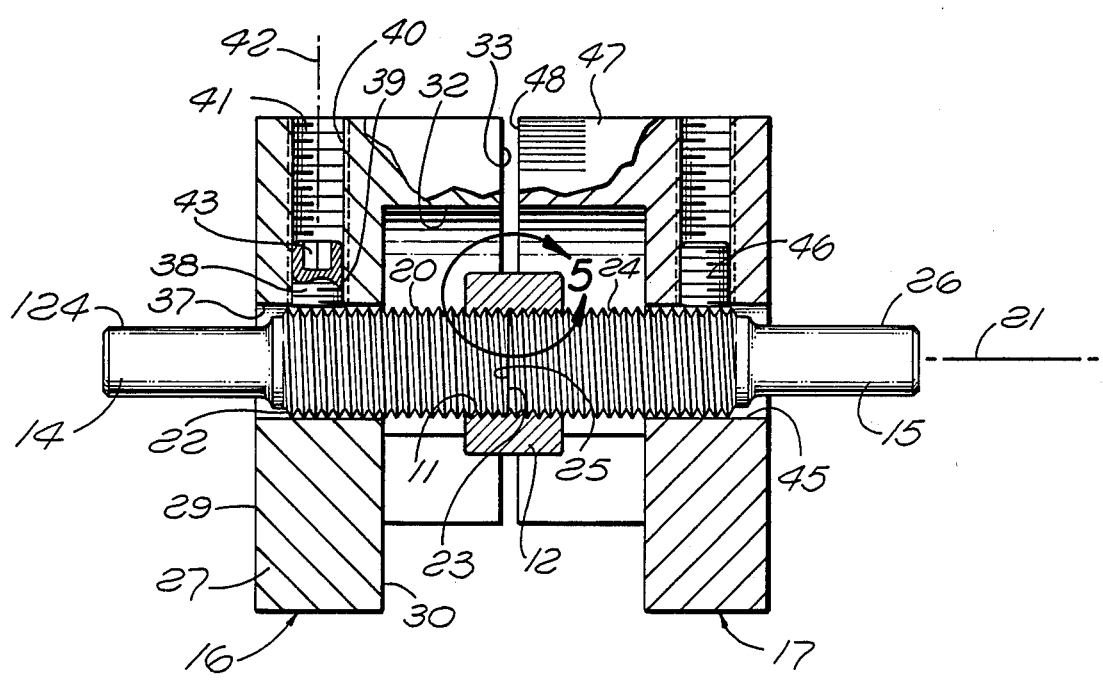
FIG. 3

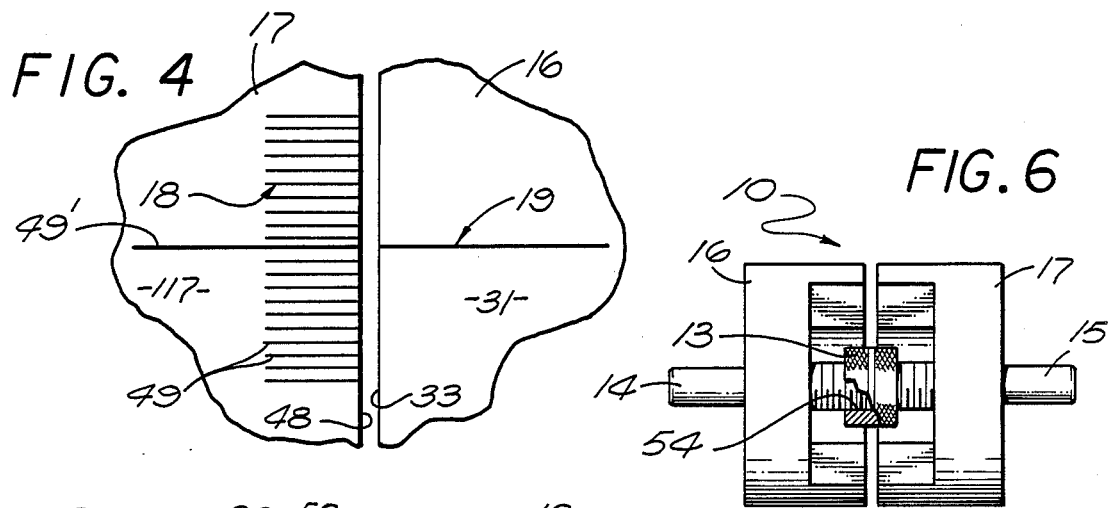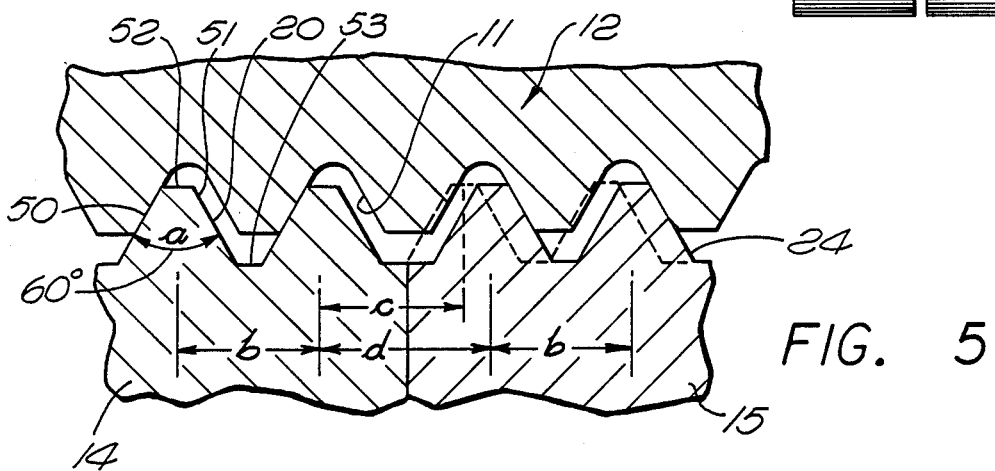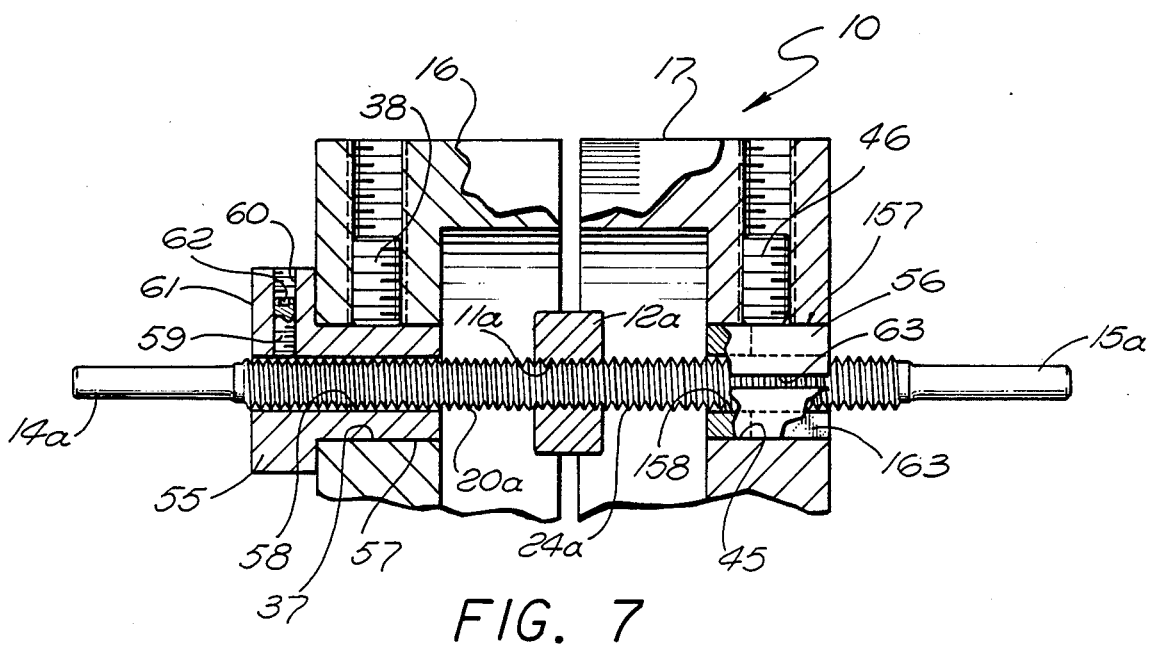

_4,856,198_

GAUGE FOR INTERNAL THREADS

BACKGROUND OF THE INVENTION

This invention relates to improved gauges for measuring precisely the size of a thread.

U.S. Pat. No. 4,417,402 issued Nov. 29, 1983 to Mark Hattan on "Gauging Of Thread Diameters" discloses and claims a unique type of gauge for measuring the size of an internal screw thread in a nut or other internally threaded member. Gauges embodying the invention of that patent are capable of measuring internal threads very accurately and reliably, and doing so in virtually any diameter of thread including very small sizes which can not effectively be measured by many previously proposed types of internal thread gauges. Structurally, a gauge covered by U.S. Pat. No. 4,417,402 includes two gauge elements having similar external threads adapted to project into opposite ends of an internally threaded passage in a nut or the like, with the elements being adapted to be screwed toward one another to a limiting position in which they contact or are otherwise blocked against further relative axial advancement. The gauge elements have indicator portions which extend externally of the threaded passage to locations at which the rotary setting of one of the indicator portions can be read against the rotary setting of the other indicator portion as a measurement of the effective pitch diameter and functional size of the internal thread.

SUMMARY OF THE INVENTION

A major purpose of the present invention is to provide an internal thread gauge which is of the above discussed general type, but which incorporates certain improvements for increasing the versatility of the gauge and its adaptability to different use situations, and for reducing the cost involved in producing the gauge. A gauge embodying the invention may be designed to include one or more conventional externally threaded gauge plugs or elements, which may in one condition function as parts of an overall internal gauge assembly, and which in another condition may be used separately in other types of gauging procedures. In conjunction with two such elements, a gauge assembly formed in accordance with the invention may include two indicator parts which extend about outer ends of the gauge elements at opposite ends of the internally threaded nut being measured, and which are detachably connected to those outer ends of the elements and project to locations at which markings on the two indicators are readable against one another as a measurement of the size of the internal thread in the nut. Appropriate means are provided for releasably locking the indicators in fixed positions relative to the gauge elements, as by set screws threadedly connected to the indicators and tightenable against the gauge elements.

At least one of the indicators is preferably rotatably adjustable relative to the gauge element by which it s carried, to enable initial setting of the indicators relative to one another to a predetermined zero or reference position when engaged with a standard thread of known diameter. Desirably, both of the indicators are rotatably adjustable relative to their respective gauge elements, and each is completely detachable from the corresponding gauge element. In the preferred arrangement, the indicators are essentially cup shaped, with each of these indicators having an end wall containing an opening through which the corresponding gauge element extends, and having a side wall projecting toward the other indicator and carrying measurement markings and having an interruption providing a gap through which a user may reach into the interior of the cup shaped part to locate and hold a nut being measured. Tubular bushings may be provided within the openings in the indicators and about the gauge elements, to permit use of gauge elements of different sizes in conjunction with the indicators and thus adapt the overall device for use in measuring any of numerous different sizes of internal thread.

BRIEF DESCRIPTION OF THE DRAWINGS

The above and other features and objects of the invention will be better understood from the following detailed description of the typical embodiment illustrated in the accompanying drawings, in which:

FIG. 1 is a side elevational view of an internal thread gauge formed in accordance with the invention and shown as it appears when being utilized for measuring the effective pitch diameter of an internal thread within a nut;

FIG. 2 is a transverse section taken on line 2—2 of FIG. 1;

FIG. 3 is an enlarged axial section taken on line 3—3 of FIG. 2;

FIG. 4 is an enlarged fragmentary elevational view taken on line 4—4 of FIG. 2;

FIG. 5 is an enlarged fragmentary representation in axial section of portions of the threads contained within the circle 5 of FIG. 3;

FIG. 6 is a view similar to FIG. 1, but showing the gauge device as it appears while being adjusted to a predetermined initial zero or reference setting by calibration to an internally threaded ring gauge of precisely known size; and FIG. 7 is a fragmentary sectional view similar to a portion of FIG. 3, but showing the device as utilized with adaptor bushings for enabling employment with the indicator parts of externally threaded gauge plugs of different diameters.

DESCRIPTION OF THE PREFERRED EMBODIMENT

Referring first to FIG. 1, there is illustrated in that figure a gauge device 10 to be utilized for measuring the effective internal pitch diameter or size of an internal thread 11 (FIG. 3) formed within a nut 12 or other internally threaded part. The gauge may be initially calibrated or set to a predetermined reference condition by engagement with the internal thread of a precisely dimensioned gauge ring 13 in the manner illustrated in FIG. 6. The gauge 10 includes two essentially conventional and preferably essentially identical externally threaded gauge plugs 14 and 15 which are connectable into opposite ends of the internal thread within nut 12 and which are connected to a pair of similar indicator members 16 and 17 carrying markings 18 and 19 (FIG. 4) whose relative positioning in a finger tight condition of the gauge indicates the size of the internal thread of nut 12 as compared with the internal thread of the reference element 13.

As seen best in FIG. 3, gauge plug 14 has an external thread 20 centered about a longitudinal axis 21 of element 14 and typically extending from a location 22 to an end face 23 of element 14 which is planar and disposed directly transversely of axis 21. To the left of thread 20 as seen in FIG. 3, the gauge element 14 may have an unthreaded straight cylindrical outer surface 124 centered about axis 21 and typically of a diameter slightly less than the minor diameter of thread 20. Gauge element 15 may be identical with gauge element 14, and have an external thread 24 centered about axis 21 in the FIG. 3 assembled condition of the parts, with thread 24 preferably being identical to thread 20 of element 14 in diameter, pitch, thread profile, and all other respects The inner end face 25 of gauge element 15 is planar and disposed transversely of axis 21, to abut against end surface 23 of element 14 and thereby limit axial advancement of the elements 14 and 15 relatively toward one another beyond the FIG. 3 position of engagement of surfaces 23 and 25. The right end portion of gauge element 15 as viewed in FIG. 3 has an unthreaded straight cylindrical surface 26 centered about axis 21 and preferably of the same diameter and length as surface 24 of element 14. The elements 14 and 15 may thus be in all respects identical, and may be conventional gauge 'plugs' of a known type utilized for manual testing of the size of an internal thread by screwing such a plug into the thread to see if it fits.

The part 16 is detachably connectable to gauge element 14 and rotatably adjustable relative thereto, and functions as an indicator element and as a handle for manually turning gauge element 14 if desired. This indicator part 16 and the similar indicator 17 are formed of a rigid material, preferably a suitable metal such as aluminum. The gauge parts 14 and 15 are also formed of a rigid material, but desirably one having greater strength and wear resisting characteristics than required for the parts 16 and 17, to assure against damage to or distortion or wear of the gauging threads 20 and 24 upon whose shape characteristics the precision of the ultimate reading given by the gauge depends. For this reason, gauge elements 14 and 15 may be formed of an extremely hard and wear resistant material such as an appropriate hardened, stabilized tool steel.

Indicator part 16 is of an essentially cup shaped configuration, having an end wall 27 extending transversely of axis 21 of the assembly and carrying a side wall 28 of the cup projecting rightwardly as viewed in FIG. 3 essentially parallel to and centered about axis 21. More particularly, end wall 27 of the cup shaped indicator 16 may be defined by two oppositely facing planar parallel surfaces 29 and 30 disposed perpendicular to axis 21. Side wall 28 of the cup shaped part may be defined by a radially outer cylindrical surface 31 centered about axis 21 and a concentric radially inner cylindrical surface 32 also centered about axis 21. At its right end as viewed in FIG. 3, the cup shaped member 16 may have an end face 33 which is planar and disposed transversely of axis 21. Side wall 28 is interrupted at one location about the axis (left side of FIG. 2), to define a gap 34 circularly between two surfaces 35 and 36 on side wall 28 enabling a user to reach into the interior of the cup shaped part through that gap 34 to manually hold nut 12 and retain it against rotation in any desired setting on the threads of elements 14 and 15. The external surface 31 of part 16 continues leftwardly in FIG. 3 to the plane of transverse end surface 29 of part 16, and extends entirely circularly about end wall 27 of part 16 as will be apparent from FIG. 2.

End wall 27 of indicator part 16 contains a central passage 37 defined by a surface which is cylindrical and centered about axis 21 and is of a diameter just slightly greater than the major diameter of external thread 20 on gauge 14, to very closely receive thread 20 in a relation accurately locating gauge element 14 within passage 37 in a precisely aligned condition with respect to part 16. A set screw 38 having an external thread 39 is connectable into a passage 40 formed in end wall 27 of indicator 16 and containing an internal thread 41 adapted to threadedly engage the set screw and allow it to be tightened radially inwardly against thread 20 of gauge element 14 to lock indicator 16 in any desired rotary setting relative to gauge element 14. Passage 40 and the set screw 38 extend along an axis 42 which intersects and is perpendicular to axis 21. At its radially outer extremity, set screw 38 may contain a recess 43 which is non-circular about axis 42 and may be shaped for engagement with an allen wrench to allow tightening or loosening of the set screw by such a wrench or other tool.

The second indicator part 17 may be identical with part 16 except as to the configuration of the different coacting indicator markings 18 and 19 on the two parts. More particularly, indicator 17 is of the same cup shaped configuration as indicator 16, having an end wall 44 corresponding to end wall 27 of part 16 and containing a cylindrical central passage 45 which fits closely about the major diameter of thread 24 of gauge element 15 and is retainable in any desired rotary position by a set screw 46 corresponding to set screw 38 of the first indicator. Also, the cup shaped part 17 has a side wall 47 projecting axially toward part 16 and shaped the same as side wall 28 of part 16, and terminating in an end face 48 which is perpendicular to axis 21 and planar and is received closely proximate end surface 33 of indicator part 16 in the FIG. 3 condition of the parts.

As seen best in FIG. 4, the marking 19 on the outer surface 31 of indicator part 16 may be a single index marking formed as a groove in surface 31 adjacent end face 33 and extending parallel to axis 21 of the device. The coacting markings 18 on indicator part 17 are similarly formed on the outer cylindrical surface 117 of part 17, adjacent end face 48, and consist of a series of equally circularly spaced parallel grooves or other lines 49 formed in or on part 17 and adapted to be read against the closely adjacent index marking on part 16. A central one of the marks 49′ on part 17 may be longer than the other marks 49, as indicated in FIG. 4, to function as a zero indicator when received directly opposite and in alignment with index marking 19.

As seen in FIG. 5, the precisely formed preferably identical external threads 20 and 24 of gauge elements 14 and 15 are preferably conventional 60 degree threads of standard formation similar to that of the typically illustrated standard 60 degree internal thread 11 of nut 12 to be measured. Each of the threads 20 and 24 as viewed in axial section desirably has two opposite side faces 50 and 51 disposed at an included angle a relative to one another which is preferably 60 degrees as mentioned, with axial crest and root surfaces 52 and 53. In one rotary setting of gauge element 14 relative to gauge element 15, the two threads 20 and 24 are so located as to be in effect precisely positioned helical continuations of one another. This position is represented by the full lines of thread 20 in FIG. 5 and the broken line position of thread 24 in that figure. In that setting of the parts. The axial pitch distance b between successive turns of the thread 20 and successive turns of the thread 24 is equal to the pitch distance c between the right end turn of thread 20 of element 14 and lefthand or nearest turn of thread 24 of element 15. If element 15 is turned from that position about axis 21 in one direction, that relative rotation acts to move the portion of thread 24 which is seen in FIG. 5 rightwardly relative to and away from the corresponding portion of thread 20, to increase the pitch distance between the nearest threads of the elements 14 and 15 to a greater dimension such as that represented at d in FIG. 5. This increase in effective pitch distance is of course directly proportional to the angle through which part 15 is rotated relative to part 14.

In utilizing the gauge 10 as shown in FIGS. 1 through 6 to measure the effective pitch diameter of the internal thread 11 in nut 12, a first step is to initially calibrate the gauge 10 with respect to a reference internal thread of precisely known size and shape characteristics such as the internal thread 54 within ring gauge 13 of FIG. 6. To calibrate the gauge, a user first tightens the set screws 38 and 46 to lock indicator cups 16 and 17 in fixed positions relative to the gauge elements 14 and 15 approximately as shown in FIG. 3. In this condition, the end surface 23 of gauge element 14 should project rightwardly slightly beyond the plane of end face 33 of indicator 16, and the end face 25 of gauge element 15 should project leftwardly slightly beyond the plane of end face 48 of indicator cup 17, to maintain surfaces 33 and 48 in slightly spaced relation in the FIG. 3 condition of the parts. With the indicator parts 16 and 17 thus rigidly attached to gauge elements 14 and 15 respectively, a user may hold gauge ring 13 with one hand and manually screw one of the gauge elements (say element 14) into one end of ring 13. Similarly, the second gauge element 15 may be screwed into the opposite end of the internal thread in gauge ring 13, with the two gauge elements 14 and 15 each desirably projecting approximately half-way through the axial extent of ring 13. The threaded gauge elements 14 and 15 are in this way advanced threadedly toward one another within ring 13 until they just contact, in lightly engaging finger tight relation at which such contact of surfaces 23 and 25 prevents further threaded advancement of the parts toward one another. One of the set screws 38 or 46 is then loosened to allow rotation of the corresponding indicator part 16 or 17 relative to the gauge element 14 or 15 by which it is carried, and that indicator is then turned to a position in which the markings 18 and 19 on the indicator parts are in the zero setting of FIG. 4, with index marking 19 directly opposite the central zero marking 49' on part 17. The set screw is tightened with the parts in this condition, so that alignment of the marking 19 and 49' thereafter indicates engagement with an internal thread corresponding in effective diameter and other shape and size characteristics with the internal thread 54 in reference gauge ring 13. In that finger tight condition of the parts, the threads 20 and 24 of the gauge elements bear in opposite axial directions against the internal thread of ring 13 in the manner illustrated in full lines in FIG. 5. It may be assumed in most instances that the shape and diameter of the internal thread in ring 13 is identical to the intended shape and diameter of the internal thread within the nut 12 to be measured.

After the device has been calibrated with respect to reference ring 13 as discussed, the user turns indicators 16 and 17 and their connected gauge elements 14 and 15 in opposite directions to unscrew them from gauge ring 13. The gauge elements 14 and 15 are then screwed into opposite ends of the internal thread in the nut 12 to be measured, in the same manner discussed in connection with ring 13, and until the opposite end surfaces 23 and 25 of gauge elements 14 and 15 contact in a finger tight relation at approximately the center of the axial extent of nut 12 to limit advancement of element 14 and 15 relatively together in that condition. If the effective pitch diameter of the internal thread in nut 12 is identical with that of the internal thread in the gauge ring 13, the marking 49' will then be directly opposite and in axial alignment with marking 19 as represented in FIG. 4, indicating that the functional size of the thread within the nut is precisely correct. If, however, the effective diameter of the internal thread of the nut is slightly different than that of the internal thread in ring 13, the positioning of index marking 19 will be slightly offset circularly from marking 49', in one direction if the thread within nut 12 is slightly undersize as compared with the internal thread in gauge element 13, and in the other direction if the internal thread in nut 12 is slightly oversize with respect to the thread in ring 13. Each of the markings 49 on gauge element 17 may represent a variation in diameter of a predetermined amount, say one one-thousandth of an inch, so that the user can tell directly and precisely exactly how much oversize or undersize the internal thread in nut 12 is by reference to the direction in which index marking 19 is offset from marking 49', and the number of the spaced shorter markings 49 by which marking 19 is offset from marking 49'.

If it is desired to utilize the device 10 for measurement of an internal thread 11a within a nut 12a of a substantially different size than the nut 12 of FIGS. 1 to 6, the device may be adapted in the manner illustrated in FIG. 7 for use with gauge elements or plugs 14a and 15a having external threads 20a and 24a smaller in size than threads 20 and 24 of FIGS. 1 to 6. For this purpose, two tubular bushings 55 and 56 may be connected into passages 37 and 45 in indicator parts 16 and 17 to reduce the effective size of those passages. These bushings 55 and 56 may take any of various different forms, two of which are typically illustrated in the drawing. To describe first the bushing 55 illustrated in the left hand portion of FIG. 7, that bushing has an outer cylindrical surface 57 which is a close fit within the cylindrical passage 37 in part 16, and is adapted to be locked in fixed position relative thereto by tightening of the set screw 38. Internally, bushing 55 has an inner cylindrical surface 58 which is a close fit about external thread 20a of part 14a. A set screw 59 connected threadedly into a radially extending threaded passage 60 in a flange portion 61 of bushing 55, at a location axially outwardly beyond the corresponding indicator part 16, is tightenable radially inwardly against the outer surface of the gauge element 14a to releasably lock the bushing in a fixed position relative to part 14a. As in the case of the other set screws 38 and 46, set screw 59 may have a non-circular recess 62 in its radially outer end for engagement with an allen wrench or other tool for tightening the set screw threadedly relative to the bushing 55 and inwardly against part 14a.

The second bushing 56 of FIG. 7 is illustrated as a split ring, having an outer cylindrical surface 157 received within bore 45 in part 17, and having an inner cylindrical surface 158 which is a close fit on external thread 24a of part 15a. The ring 56 is interrupted by an axial slit or gap 63 to be constrictable against thread 24a by tightening of set screw 46. Thus, the bushing 56 and gauge element 15a may be simultaneously locked in any desired position relative to part 17 by tightening of a single set screw. To facilitate constriction of bushing 56, it may have additional axial slits 163 at other locations about its circular extent, with those additional slits extending through only a portion of the axial extent of the bushing.

In using the gauge of FIG. 7, the device is initially calibrated by threaded engagement with a gauge ring of predetermined size in the same manner discussed in connection with ring 13 of FIG. 6. Part 16 may be adjusted rotatably relative to gauge element 14a by loosening set screw 38 to allow rotation of part 16 relative to bushing 55, or by loosening set screw 59 to allow rotation of the bushing relative to part 14a, with the set screws then being tightened to retain the indicator markings in the FIG. 4 condition when gauge elements 14a and 15a are in their finger tight abutting engagement within a gauge ring as discussed. After such calibration, gauge elements 14a and 15a can be unscrewed from the gauge ring corresponding to ring 13 of FIG. 6, and then screwed into the nut 12a to be measured, with the threaded advancement of the parts toward one another being halted in the finger tight condition in which the inner ends of elements 14a and 15a just lightly contact one another, and the threads 20a and 24a bear lightly in opposite axial directions against the internal thread 11a in nut 12a. The relative positioning of the markings on parts 16 and 17 then indicates whether the thread in nut 12a is undersize or oversize, and the extent to which it is undersize or oversize. If the threads to be measured are even smaller than those of the gauge elements 14a and 15a, other bushings corresponding to those shown at 55 and 56 but having smaller internal diameters engageable with other externally threaded gauge elements having threads of still smaller size may be connected into parts 16 and 17 and utilized in connection with those smaller gauge elements in substitution for elements 14a and 15a. Thus, a single set of indicator cups 16 and 17 may be employed with different bushings and a whole series of differently sized externally threaded conventional gauge plugs 14, 15, 14a, 15a, etc., to measure an entire range of differently dimensioned threads. When not in use in the combination discussed above, the externally threaded conventional gauge plugs 14, 14a, etc. may be employed in the usual manner as gauges adapted to be manually screwed into internal threads as conventional measurements of their internal size.

While certain specific embodiments of the present invention have been disclosed as typical, the invention is of course not limited to these particular forms, but rather is applicable broadly to all such variations as fall within the scope of the appended claims.

We claim:

1. A gauge for measuring an internal thread, which thread is formed within a passage in a member and extends along an axis, comprising:
   first and second gauge elements having similar external threads adapted to project into said passage along said axis from opposite first and second ends of the passage in threaded engagement with opposite ends respectively of said internal thread;
   said gauge elements being free for rotation about said axis relative to one another to threadedly adjust their relative axial positions, and being retained against axial movement relative to one another beyond a predetermined relative axial position;
   a first indicator disposed about said first gauge element at a location axially outwardly beyond said first end of said passage and detachably connected to said first gauge element at said location for rotation therewith; and
   a second indicator disposed about said second gauge element at a location axially outwardly beyond said second end of said passage and detachably connected to said second gauge element at said location beyond said second end of the passage for rotation therewith;
   said indicators extending externally of said passage to positions at which the rotary setting of one can be read against the rotary setting of the other, as a measurement of the functional size of the internal thread.

2. A gauge as recited in claim 1, in which said first indicator is rotatably adjustable about said axis relative to said first gauge element, there being means for releasably retaining said first indicator in any of different rotary settings about said axis relative to said first gauge element.

3. A gauge as recited in claim 1, in which each of said first and second indicators is rotatably adjustable about said axis relative to the gauge element to which it is detachably connected, there being means for releasably retaining each of said indicators in any of different rotary settings about said axis relative to the gauge element to which it is connected.

4. A gauge as recited in claim 1, in which each of said first and second indicators is rotatably adjustable about said axis relative to the gauge element to which it is connected, there being two fasteners carried by said first and second indicators respectively and tightenable relative to said first and second gauge elements respectively to releasably retain each of said first and second indicators in any of different relative rotary settings about said axis relative to the gauge element to which it is connected.

5. A gauge as recited in claim 1, in which said first indicator is of generally cup shaped configuration, having an end wall containing an opening receiving said first gauge element and projecting generally radially outwardly therefrom, and having a side wall projecting generally axially from said end wall toward the second indicator and at a location radially outwardly of said member with the internal thread.

6. A gauge as recited in claim 5, in which said side wall of the said first indicator is interrupted at one side of said axis to enable a user to reach and hold said member.

7. A gauge as recited in claim 6, in which said side wall has a marking or markings coacting with a marking or markings on said second indicator to measure the functional size of said internal thread.

8. A gauge as recited in claim 1, in which said first and second indicators are both of generally cup shaped configuration, each having an end wall containing an opening within which a corresponding one of said gauge elements is received, and each having a side wall projecting generally axially from said end wall toward the other of said indicators and at a location radially outwardly of said member.

9. A gauge as recited in claim 8, in which said side walls of said cup shaped indicators have markings near one another coacting to indicate the relative rotary settings of the indicators and gauge elements.

10. A gauge as recited in claim 9, in which said side walls of said cup shaped indicators extend only partially about said axis and are interrupted at predetermined locations enabling a user to reach and hold said member.

11. A gauge as recited in claim 10, in which each of said first and second indicators is rotatably adjustable about said axis relative to the gauge element to which it is detachably connected.

12. A gauge as recited in claim 11, including two fasteners carried by said first and second indicators respectively and tightenable relative to said first and second gauge elements respectively to releasably retain the indicators in any of different rotary settings about said axis relative to said two gauge elements respectively.

13. A gauge as recited in claim 1, in which said first indicator contains an opening within which said first gauge element is received, there being a tubular bushing received within said opening and about said first gauge element for changing the effective size of said opening and thereby enabling connection of different size gauge elements to said first indicator.

14. A gauge as recited in claim 13, including a first fastener for releasably attaching said bushing to said first indicator in fixed position relative thereto, and a second fastener for releasably retaining said first gauge element in fixed position relative to said bushing.

15. A gauge as recited in claim 1, in which each of said first and second indicators contains an opening through which a corresponding one of said gauge elements extends, there being two tubular bushings received within said openings in said first and second indicators respectively and about said gauge elements.

16. A gauge as recited in claim 15, including two fasteners carried by said bushings respectively and tightenable against said first and second gauge elements respectively to releasably retain the bushings in fixed positions relative to the gauge elements, and two additional fasteners carried by said first and second indicators respectively and tightenable relative to said bushings to releasably retain said indicators in fixed positions relative to the bushings.

17. A gauge for measuring an internal thread, which thread is formed within a passage in a member and extends along an axis, comprising:
 first and second gauge elements having similar external threads adapted to project into said passage along said axis from opposite first and second ends of the passage in threaded engagement with opposite ends respectively of said internal thread;
 said gauge elements being free for rotation about said axis relative to one another to threadedly adjust their relative axial positions, and being retained against axial movement relative to one another beyond a predetermined relative axial position;
 a first indicator carried by said first gauge element at a location axially outwardly beyond said first end of said passage for rotation with said first gauge element;
 a second indicator carried by said second gauge element at a location axially outwardly beyond said second end of said passage for rotation with said second gauge element;
 said indicators extending externally of said passage to positions at which the rotary setting of one can be read against the rotary setting of the other, as a measurement of the size of the internal thread;
 said first indicator being rotatably adjustable about said axis relative to said first gauge element; and
 means for releasably retaining said first indicator in any of different rotary settings about said axis relative to said first gauge element.

18. A gauge as recited in claim 17, in which said second indicator is rotatably adjustable about said axis relative to said second gauge element, there being means for releasably retaining said second indicator in any of different rotary settings about said axis relative to said second gauge element.

19. A gauge as recited in claim 18, in which each of said means comprises a fastener carried by one of said indicators and tightenable relative to a corresponding one of said gauge elements.

20. A gauge as recited in claim 19, in which each of said indicators is a generally cup shaped part having a side wall projecting generally axially toward the other indicator essentially about said member, with said side walls carrying markings coacting to indicate the relative rotary setting of the gauge elements.

21. A gauge as recited in claim 20, in which said side walls of the two indicators are interrupted to provide openings through which a user can reach and hold said member.

22. For use with a member containing a passage having an internal thread extending along an axis, and first and second gauge elements having similar external threads adapted to project into said passage along said axis from opposite first and second ends of the passage in threaded engagement with opposite ends respectively of said internal thread, with said gauge elements being free for rotation about said axis relative to one another, and being retained against axial movement relative to one another beyond a predetermined relative axial position, the combination comprising:
 a first indicator adapted to be disposed about said first gauge element at a location axially outwardly beyond said first end of said passage and to be detachably connected to said first gauge element at said location for rotation therewith; and
 a second indicator adapted to be disposed about said second gauge element at a location axially outwardly beyond said second end of said passage and to be detachably connected to said second gauge element at said location beyond said second end of the passage for rotation therewith;
 said indicators being adapted to extend externally of said passage to positions at which the rotary setting of one can be read against the rotary setting of the other, as a measurement of the size of the internal thread.

23. The combination as recited in claim 22, in which said first indicator is adapted to be rotatably adjusted about said axis relative to said first gauge element, there being means for releasably retaining said first indicator in any of different rotary settings about said axis relative to said first gauge element.

24. The combination as recited in claim 22, in which each of said first and second indicators is adapted to be rotatably adjusted about said axis relative to the gauge element to which it is detachably connectable, there being means for releasably retaining each of said indicators in any of different rotary settings about said axis relative to the gauge element to which it is connectable.

25. The combination as recited in claim 22, in which said first indicator is of generally cup shaped configuration, having an end wall containing an opening for receiving said first gauge element and projecting generally radially outwardly therefrom, and having a side wall projecting generally axially from said end wall toward the second indicator and at a location radially outwardly of said member with the internal thread.

26. The combination as recited in claim 25, in which said side wall of said first indicator is interrupted at one side of said axis to enable a user to reach and hold said member.

27. The combination as recited in claim 22, in which said first and second indicators are both of generally cup shaped configuration, each having an end wall containing an opening within which a corresponding one of said gauge elements is received, and each having a side wall projecting generally axially from said end wall toward the other of said indicators and at a location radially outwardly of said member.

28. The combination as recited in claim 27, in which said side walls of said cup shaped indicators have markings near one another coacting to indicate the relative rotary settings of the indicators and gauge elements.

29. The combination as recited in claim 28, in which said side walls of said cup shaped indicators extend only partially about said axis and are interrupted at predetermined locations enabling a user to reach and hold said member.

30. The combination as recited in claim 29, in which each of said first and second indicators is rotatably adjustable about said axis relative to the gauge element to which it is detachably connected, there being two fasteners carried by said first and second indicators respectively and tightenable relative to said first and second gauge elements respectively to releasably retain the indicators in any of different rotary settings about said axis relative to said gauge elements respectively.

31. The combination as recited in claim 22, in which said first indicator contains an opening within which said first gauge element is receivable, there being a tubular bushing received within said opening and about said first gauge element for changing the effective size of said opening and thereby enabling connection of different size gauge elements to said first indicator.

32. The combination as recited in claim 22, in which each of said first and second indicators is a cup shaped part containing an opening within which a corresponding one of said gauge elements extends, there being two tubular bushings received within said openings in said first and second indicators respectively and about said gauge elements, a first pair of fasteners carried by said bushings respectively and tightenable relative to said first and second gauge elements to releasably retain the bushings in fixed positions relative to the gauge elements, and a second pair of fasteners carried by the first and second indicators respectively and tightenable relative to said bushings to releasably retain the indicators in fixed positions relative to the bushings.

33. For use with a member containing a passage having an internal thread extending along an axis, and first and second gauge elements having similar external threads adapted to project into said passage along said axis from opposite first and second ends of the passage in threaded engagement with opposite ends respectively of said internal thread, with said gauge elements being free for rotation about said axis relative to one another, and being retained against axial movement relative to one another beyond a predetermined relative axial position, the combination comprising:
  a first indicator adapted to be carried by said first gauge element at a location axially outwardly beyond said first end of said passage for rotation with the first gauge element;
  a second indicator adapted to be carried by said second gauge element at a location axially outwardly beyond said second end of said passage for rotation with said second gauge element;
  said indicators being adapted to extend externally of said passage to positions at which the rotary setting of one can be read against the rotary setting of the other, as a measurement of the size of the internal thread;
  said first indicator being adapted for rotary adjustment about said axis relative to said first gauge element; and
  means for releasably retaining said first indicator in any of different rotary settings about said axis relative to said first gauge element.

34. The combination as recited in claim 33, in which said second indicator is adapted for rotary adjustment about said axis relative to said second gauge element, there being means for releasably retaining said second indicator in any of different rotary settings about said axis relative to said second gauge element.

35. The combination as recited in claim 34, in which each of said means comprises a fastener carried by one of said indicators and tightenable relative to a corresponding one of said gauge elements.

36. The combination as recited in claim 35, in which each of said indicators is a generally cup shaped part having a side wall projecting generally axially toward the other indicator essentially about said member, with said side walls carrying markings coacting to indicate the relative rotary setting of the gauge elements, and with said side walls being interrupted to provide openings through which a user can reach and hold said member.

37. The method that comprises:
  screwing first and second gauge elements having similar external threads into opposite ends of an internal thread of known size formed in a passage in a member and centered about an axis, and to a limiting position in which further axial advancement of said elements toward one another is blocked;
  said first and second gauge elements carrying first and second indicators respectively which extend externally of said passage to positions at which the setting of one can be read against the other;
  turning said first indicator about said axis relative to said first gauge element to a predetermined reference setting relative to the second indicator, while said gauge elements are in said limiting position;
  fastening said first indicator against rotation relative to the first gauge element with said gauge elements in said limiting position and said first indicator in said reference setting relative to the second indicator;
  removing said gauge elements from said internal thread of known size;
  screwing said gauge elements into opposite ends of a second internal thread to be measured, and to a limiting position in which further advancement of the gauge elements toward one another is blocked; and
  then reading the setting of said first and second indicators relative to one another as an indication of the difference between the size of said second internal thread and the size of said first internal thread.

* * * * *